United States Patent [19]

Rini

[11] Patent Number: 5,054,179

[45] Date of Patent: Oct. 8, 1991

[54] FAUCET VALVE REMOVAL AND INSERTION TOOL

[75] Inventor: Anthony S. Rini, Westlake, Ohio

[73] Assignee: Moen Incorporated, Elyria, Ohio

[21] Appl. No.: 472,665

[22] Filed: Jan. 30, 1990

[51] Int. Cl.[5] .......... B23P 19/04

[52] U.S. Cl. .......... 29/213.1; 10/129 M; 408/84; 408/101; 29/240; 29/264

[58] Field of Search .......... 29/213.1, 240, 263, 29/264, 270; 408/84, 101, 102, 137, 138, 215; 10/129 P, 129 M

[56] References Cited

U.S. PATENT DOCUMENTS 664,565 12/1900 Livingood .......... 29/213.1
2,649,825 8/1953 Fisher .......... 29/213.1

*Primary Examiner*—J. J. Hartman

*Attorney, Agent, or Firm*—Kinzer, Plyer, Dorn, McEachran & Jambor

[57] ABSTRACT

A water faucet valve removal and insertion tool includes a handle and a self-tapping threaded rod attached to the handle. There is a sleeve coaxial with the threaded rod and threadedly engaged therewith. The sleeve includes a rotational stop which is formed and adapted to interact with a water faucet valve. The threaded rod functions to form an internal thread in the stem of a water faucet valve to thereby attach the tool to the valve. The tool can be used to remove an installed water faucet valve or to insert a water faucet valve within a faucet housing. In either event the tool is attached to a water valve by the threaded rod and uses the rotational stop to turn an installed faucet valve or to turn a valve during insertion for proper alignment thereof.

3 Claims, 1 Drawing Sheet

FAUCET VALVE REMOVAL AND INSERTION TOOL

SUMMARY OF THE INVENTION

The present invention relates to a tool for either removing or installing a water faucet valve and in particular relates to a simply constructed, reliable tool for such purpose.

A primary purpose of the present invention is to provide a tool for use in removing or installing a water faucet valve which is positioned within a faucet housing and which may need both axial and rotational movement during removal and installation.

Another purpose is a tool for the purpose described which includes a self-tapping threaded rod for use in attaching the tool to a faucet valve and which includes a rotational stop for turning the faucet valve during either installation or removal.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

U.S. Pat. No. 4,395,018, owned by the assignee of the present application, discloses a water faucet valve, in which a majority of the parts are made of plastic, with the valve being in the form of a cartridge which is inserted within a faucet housing. The valve is of the non-mixing variety and therefore there will be one valve for the hot water side and one valve for the cold water side of a faucet. As disclosed in the '018 patent, such valves use a single valve closing seal and it has been found that after a substantial period of use it may be necessary to replace the valve if the seal therein should develop a leak.

If the valve has been installed for a substantial period of time it may be difficult to break the valve loose from the faucet housing for removal. The present invention provides a tool which is specifically designed to interact with the faucet valve cartridge of the '018 patent and to remove that cartridge from a faucet housing. The tool also is designed for use in installing a new faucet valve in the housing. The valve of the '018 patent must be properly rotationally aligned within the faucet housing in order for it to function correctly. At times this can be difficult, as during the insertion of the valve the faucet housing stop is somewhat obscured. The present tool, by being attached to the faucet valve, provides for easy insertion.

Figure 1:
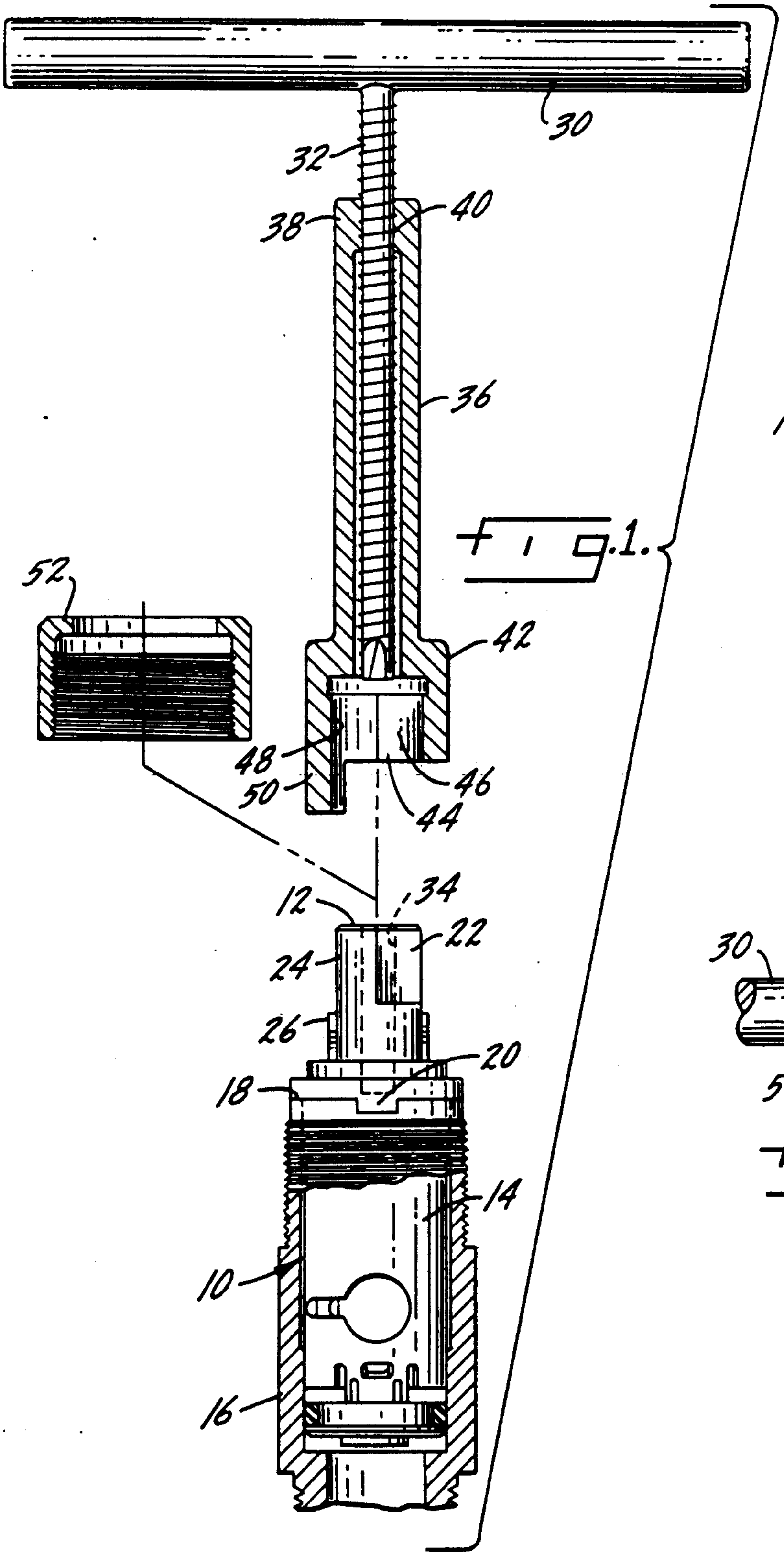
FIG. 1 an exploded view illustrating the tool of the present invention, positioned for interaction with a water faucet valve in the form of a valve cartridge.

In FIG. 1 a water faucet valve cartridge of the type disclosed in the '018 patent is illustrated at 10. The valve 10 has a stem 12 which may be conventionally formed of plastic and a sleeve 14, with the valve 10 being inserted within a faucet housing 16. The valve when positioned within the faucet housing bottoms on a top housing shoulder 18 and has a rotational stop 20 which interacts with a mating recess on the interior of faucet housing 16 when the valve is properly positioned.

Figure 2:
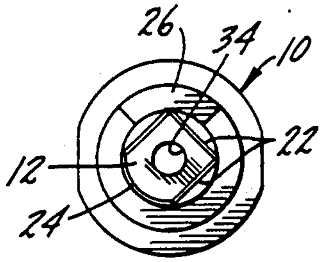
FIG. 2 is a top view of the water faucet valve shown in FIG. 1, and FIG. 3 a bottom view of the tool illustrated in FIG. 1.

Stem 12 is designed to receive an operating handle and to correctly locate the handle and to secure it to the stem, the stem has three flatted sides 22 and a curved side 24. Adjacent to the stem and as a part of the sleeve, there is an axial projection 26 which extends outwardly from the sleeve and axially along a portion of the stem. Projection 26, illustrated particularly in FIG. 2, has an arcuate extent of approximately 90 degrees.

The cartridge removal tool includes a handle 30 which is fixed to a self-tapping threaded rod 32. The rod diameter and thread size are specifically designed to form a thread in an interior bore 34 in plastic stem 12. An elongated sleeve 36 extends axially along threaded rod 32, with one end of the sleeve, indicated at 38, having a threaded portion 40 whereby the rod and the sleeve are threadedly engaged.

Figure 3:
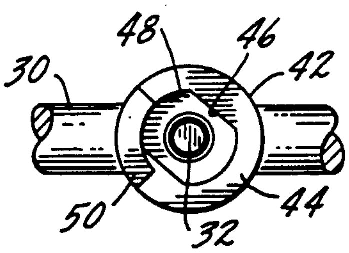

Sleeve 36 includes an enlarged portion 42 which has a socket 44 with a size and configuration, as indicated in FIG. 3, whereby the stem 12 of valve 10 extends within the socket when the tool is applied to the water faucet valve. Socket 44 has two flat sides 46 and two curved sides 48 so that there are two positions in which the tool may be attached to the valve stem.

The enlarged portion 42 of sleeve 36 includes an axial projection 50 having an arcuate extent of approximately 90 degrees which is used to apply a turning force to an installed valve cartridge or to turn a valve cartridge during insertion thereof so as to properly align stop 20 with the recess on the inside of the faucet housing.

Normally, valve 10 will be held within the housing by a threaded nut 52. The first step in removing the valve cartridge is to remove the nut. The tool is then axially aligned with the valve cartridge and turned until the socket is positioned to slide onto the valve stem. The circumferential position of projection 50 is related to the configuration of the socket such that when the stem 12 is positioned within the socket, projection 50 will be circumferentially on one side or the other of valve sleeve projection 26. Handle 30 is then turned which will run the threaded rod down into bore 34 of the valve stem. This will thread the bore 34 and attach the rod and hence the tool to the valve cartridge. The threaded rod is turned down until handle 30 contacts the top of sleeve 36. One or two additional turns on the handle move the cartridge axially outward from housing 16 so that stop 20 is clear of its mating recess.

If the cartridge has been installed for a number of years, corrosion may have developed a bond between the exterior of the valve and the interior of the faucet housing. Axial movement as described breaks this bond. Once the cartridge is free, the tool and cartridge are turned and moved axially away from the faucet housing to complete removal of the cartridge.

To insert a new cartridge, the first step is to attach the tool by means of self-tapping rod 32 to the new valve cartridge stem. The tool and attached cartridge are then positioned over the cavity in the faucet housing and the cartridge is inserted into the cavity. The interaction between projections 50 and 26 is used to rotate the cartridge once it is within the faucet housing. Rotation continues until stop 20 is properly aligned with its mating recess in the faucet housing. Once the cartridge is fully seated within the faucet housing, handle 30 is turned to back the threaded rod out of the stem and the tool is then pulled away from the cartridge. Nut 52 may then be screwed onto the faucet housing to complete the assembly process.

Whereas the preferred form of the invention has been shown and described herein, it should be realized that there may be many modifications, substitutions and alterations thereto.

The embodiments of the invention in which an exclusive property or privilege is claimed are defined as follows:

1. A water faucet removal and insertion tool for use with a water faucet valve having an axially extending projection of limited arcuate extent and an interior water faucet stem, said tool including a handle, a self-tapping threaded rod attached to said handle, the self-tapping threaded rod functioning to form an internal thread in the water faucet valve stem to thereby attach the tool to the valve, a sleeve coaxial with said threaded rod and threadedly engaged therewith, said sleeve having a socket of a size and configuration to mate with the exterior of the water faucet stem so that the stem is positioned within the socket during removal and insertion of the water faucet valve, said sleeve including a projection of limited arcuate extent extending axially beyond the end of the sleeve and being positioned circumferentially adjacent the water faucet valve axial projection when the valve stem is within said tool socket whereby a turning of the sleeve has the effect of turning a water faucet valve attached thereto for applying a turning force to an installed water faucet valve or to turn a water faucet valve during installation for the alignment thereof.

2. The tool of claim 1 further characterized in that said sleeve has a first elongated portion which includes means for threadedly attaching the sleeve to the self-tapping threaded rod, and a second portion of diameter greater than that of the first portion, which second portion includes said socket.

3. The tool of claim 2 further characterized in that said sleeve first elongated portion is threadedly engaged with said self-tapping threaded rod at one end of said sleeve.

* * * * *